United States Patent [19]

Manfreda

[11] 4,176,317
[45] Nov. 27, 1979

[54] CIRCUIT ARRANGEMENT FOR DETERMINING THE FREQUENCY DEPENDENT AMPLITUDE FLUCTUATION CHARACTERISTIC OF A COMMUNICATIONS TRANSMISSION LINK

[75] Inventor: Alfred Manfreda, Germering, Fed. Rep. of Germany

[73] Assignee: Siemens Aktiengesellschaft, Berlin & Munich, Fed. Rep. of Germany

[21] Appl. No.: 770,266

[22] Filed: Feb. 22, 1977

[30] Foreign Application Priority Data

Mar. 26, 1976 [DE] Fed. Rep. of Germany ....... 2613054

[51] Int. Cl.$^2$ .............................................. H04B 1/62
[52] U.S. Cl. ...................................... 325/62; 325/363; 325/67; 324/79 D; 340/160
[58] Field of Search ...................... 325/62, 63, 67, 65, 325/363, 49; 343/177, 179; 340/147, 146.1 C, 160; 324/77 A, 77 C, 77 E, 77 B, 78 R, 78 F, 78 Z, 79 R, 79 D; 338/18; 178/69 R; 332/38

[56] References Cited

U.S. PATENT DOCUMENTS

| | | | |
|---|---|---|---|
| 2,967,998 | 1/1961 | Hurvitz | 325/363 |
| 2,972,108 | 2/1961 | Stone, Jr. | 324/79 |
| 3,415,952 | 10/1968 | Blackburn et al. | 325/62 |
| 3,456,191 | 1/1969 | Rodenburg et al. | 325/62 |
| 3,559,068 | 1/1971 | Aimering | 325/62 |
| 3,654,554 | 4/1972 | Cook | 325/63 |
| 3,732,496 | 5/1973 | Boyer | 325/62 |
| 3,895,298 | 7/1975 | Schollmeier | 325/63 |
| 3,978,408 | 8/1976 | Cupta et al. | 325/363 |
| 4,007,360 | 2/1977 | Kniel et al. | 325/63 |

*Primary Examiner*—Robert L. Griffin
*Assistant Examiner*—Tommy P. Chin
*Attorney, Agent, or Firm*—Hill, Van Santen, Steadman, Chiara & Simpson

[57] ABSTRACT

A circuit arrangement for correcting and controlling the attenuation characteristic of a communications transmission link by using adjustable attenuators in which a measuring transmitter produces a measuring signal of constant amplitude and at a frequency which is variable within the transmission frequency band and the signal is fed to an analysis device after passing through the communication transmission link so as to establish its frequency dependent amplitude variations and wherein the individual adjusting elements of the attenuators are consecutively actuated such that the amplitude variation in each case reaches a minimum value and the measuring transmitter can be consecutively switched to a series of individual frequencies which lie in frequency gaps between individual communication transmission channels and wherein digital storage means are utilized and wherein a rectifier produces a voltage which indicates the frequency dependent amplitude fluctuations of the signal to be measured.

3 Claims, 1 Drawing Figure

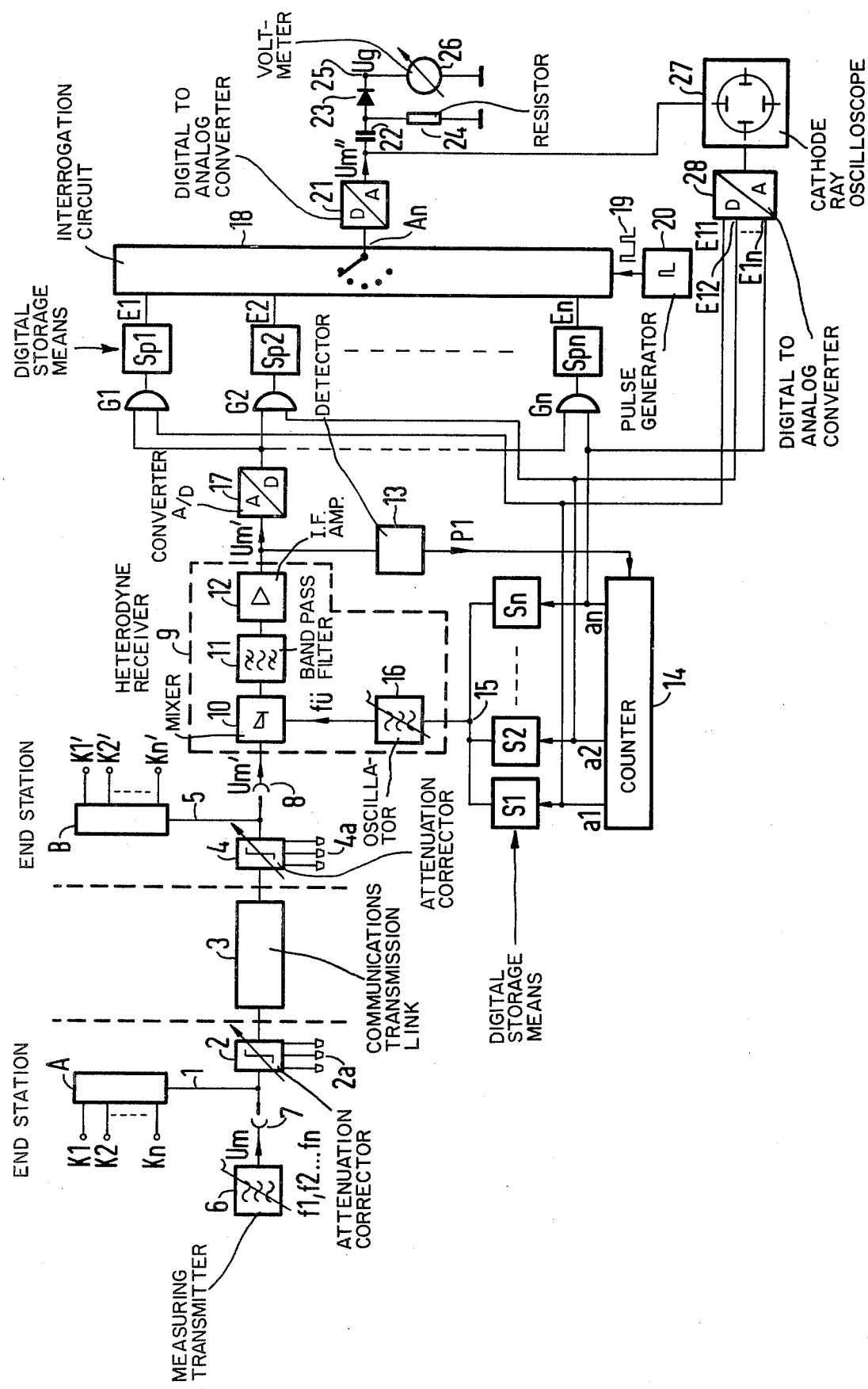

CIRCUIT ARRANGEMENT FOR DETERMINING THE FREQUENCY DEPENDENT AMPLITUDE FLUCTUATION CHARACTERISTIC OF A COMMUNICATIONS TRANSMISSION LINK

BACKGROUND OF THE INVENTION

1. Field of the Invention

The present invention relates to a circuit arrangement for correcting the attenuation characteristics of a communication transmission link.

2. Description of the Prior Art

It is often necessary and desirable to compensate and correct the attenuation characteristic of communication transmission links by using adjustable attenuators and wherein a measuring transmitter produces a measuring signal having a constant amplitude and a variable frequency that can be varied over the transmission frequency band which is passed through the communication transmission link and is then fed to an analyzing device by a switch which determines the frequency dependent amplitude fluctuation over the pass band.

A circuit arrangement of this type is disclosed in the publication "Messgeraete fuer die Nachrichtentechnik" July 1975, No. 4 published by Siemens AG of Munich, West Germany. In this arrangement, the measuring signal is scanned over the entire transmission frequency band and the received measuring signal is supplied to a rectifier circuit and is then analyzed such that the variations in the envelope curve which occur during each scanning period can be determined in a second rectifier circuit. The output of this circuit then provides a basis for measuring the distortions present in the communication transmission link and forms the basis for adjusting each individual adjusting element of the attenuation correctors.

SUMMARY OF THE INVENTION

It is an object of the present invention to provide a method and apparatus in which attenuation correction of a communication transmission path can be accomplished even during the operation of a frequency multiplex communication transmission without interfering with the communication being transmitted. This is achieved utilizing a measuring transmitter that can be consecutively switched through a plurality of individual frequencies which are located in frequency gaps between the individual communication transmission channels and digital storage means are provided which are individually assigned to the individual frequencies and in which the received measuring signals are supplied after having passed through an analog to digital converter. An interrogation circuit is provided which consecutively interrogates the individual digital storage means using a pulse train at a speed high enough that its output signal having passed through a digital analog converter and a stage which eliminates the DC mean value causes a rectifier circuit to produce a voltage which indicates the frequency dependent amplitude fluctuations of the measuring signal.

An advantage which can be achieved with the invention is that inspite of the measuring time which is required for measuring the individual frequencies and which cannot be shortened due to the build-up process and which does not allow switch-over of the measuring frequency at a frequency change speed corresponding to a scanning process still allows high speed and distinct adjustment of the adjusting means of the attenuator correctors to be accomplished.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure and in which:

BRIEF DESCRIPTION OF THE DRAWING

The drawing is a block form schematic of the invention.

DESCRIPTION OF THE PREFERRED EMBODIMENTS

The FIGURE illustrates a pair of end stations A and B of a frequency multiplex communication transmission system which contain the conventional frequency conversion and filter means for converting n communication channels. The low frequency terminals of station A are indicated K1 through Kn and the low frequency terminals at station B are indicated K1' through Kn'. The stations A and B convert the low frequency intelligence into the transmission range and transmit it through the communication link and also receive information from the transmission link and convert it into the low frequency range. The channels in the transmission frequency range are spaced next to each other frequency-wise, such that frequency gaps of a predetermined size exist between each adjacent channel. Communication signals which are connected to terminals K1 through Kn and are then supplied into station A and are frequency converted and then supplied by line 1 to a first attenuation corrector 2 which supplies its output to the communication transmission link 3 between the stations. At the other end of the transmission link 3 the signals are supplied through a second attenuation corrector 4 to a line 5 which is connected to the end station B wherein the incoming signals are reconverted to a low frequency form and supplied to the terminals K1' through Kn'. In a similar manner, communication signals which are supplied as inputs at terminals K1' through Kn' pass through the system including the line attenuator corrector 4, communications transmission link 3 and attenuation corrector 2 to station A where they are converted and supplied to terminals K1 through Kn.

The transmission characteristic of the system requires that the attenuation characteristic be as independent as possible of frequency for the communication transmission link 3 which might be a coaxial cable, for example. However, residual distortions in such a link cause attenuation which can never be entirely eliminated even with the most careful production and installation and, thus, the installed frequency response must be adjusted by the using of adjustable attenuation devices to change the attenuation characteristic to form an overall attenuation characteristic which is largely independent of frequency. The correctors 2 and 4 accomplish this result.

In order to adjust the overall attenuation characteristic during operation of the communication transmission system between stations A and B and without interfering with operation of the communication system, a measuring transmitter 6 is provided which can be switched to produce a series of individual frequencies f1 to fn each of which are located in the frequency gaps between the high frequency communication channels K1 and Kn after they have been converted to the communication transmission link frequencies. The measuring signal Um of the measuring signal transmitter 6 is maintained at a constant amplitude. The signal Um is supplied at point 7 to the input of the first attenuation corrector 2 and after passing through it passes through the communication transmission link 3, the attenuation corrector 4 and at its output is supplied at point 8 as a signal Um' to the input of a selective heterodyne receiver 9 which can be automatically tuned to the particular individual frequencies f1 through fn which is being transmitted by the measuring transmitter generator 6 at that particular time.

The heterodyne receiver 9 receives the signal to be measured Um' which has an amplitude that is dependent upon the overall attenuation characteristic occurring between the points 7 and 8 at the relevant frequency of f1 through fn where it is supplied to a mixer 10 which receives an injection frequency fü from a controllable injection oscillator 16. The output of the mixer 10 is supplied to a band pass filter 11 which passes an intermediate frequency band ZFB. The output of the band pass filter 11 is supplied to an intermediate frequency amplifier 12 where it is amplified and fed to a detector 13. When the voltage output of the measuring transmitter 6 is disconnected at the input 7 the detector 13 emits a pulse p1 which is supplied to a counter 14 which later subsequently marks the particular outputs of a series of the counter outputs $a_1, a_2$ through $a_n$ with a signal voltage. Assuming that when the measuring transmitter 6 is set at the first individual frequency f1 that the output $a_1$ of the counter 14 produces a voltage and the other outputs $a_2$ through $a_n$ have no voltages the detector 13 will when measuring transmitter generator 6 switches from frequency f1 to f2 due to the interruption in the signal Um' cause the detector 13 to produce an output pulse P1 which causes the counter 14 to supply an output voltage on line $a_2$ and disconnect the output voltage on line $a_1$.

The voltages which exist on the output lines $a_1$ through $a_n$ of the counter 14 are fed to individual associated digital storage means S1 through Sn in which the digital signals are stored. The output of the digital storage means S1 through Sn are connected to the frequency control input terminal 15 of the injection oscillator 16 which produces the injection frequency fü. It is be realized that the output of the digital storage means S1 through Sn causes the injection frequency of the oscillator 16 to be set precisely to a frequency which will cause the output of the mixer 10 after which the signal fü is mixed with the signal Um' to be at the center of the pass band of the band pass filter 11 ZFB. This is true as the output of the oscillator 6 shifts through the frequency range f1 through fn then the injection frequencies from the digital storage means S1 through Sn will also shift so that the incoming signals will fall in the center of the pass band of the band pass filter 11.

The signal to be measured Um' which occurs at the output of the amplifier 12 which has been selected and converted in frequency is fed to the input of an analog digital converter 17 which supplies an output to the first input terminals of a plurality of AND gates G1 through Gn. The output of the AND gates are connected to digital storage means Sp1 through Spn. The second inputs to the AND gates G1 through Gn are connected to $a_1$ through $a_n$ of the counter 14 as shown. Thus, it is ensured that on the occurrence of a measuring signal Um' having a frequency of f1 that the AND gate G1 will be enabled and the digitalized voltage value of Um' will be fed into the input of the storage device Sp1. On the other hand, when the signal Um' occurs when the transmitting generator 6 produces an output at a frequency of f2, then the gate G2 will be enabled from the output $a_2$ from the counter 14 and, thus, the signal associated with the frequency f2 will be stored in the storage means Sp2 and so forth for the other measuring frequencies. The rate of switch-over of the measuring frequency 6 between the individual frequencies F1 through fn can only occur at a speed such that the measuring signals Um' has time to build-up to their full amplitude values at each of the individual frequencies. Therefore, it is desirable to switch over from one individual frequency to the adjacent particular frequency after $\phi$m seconds. Then also at following intervals of 100 m seconds, the storage means Sp1 through Spn will also be fed with the amplitude values of the measured signal Um' at the given individual frequencies f1 through fn.

An interrogation circuit 18 is connected to the storage means Sp1 through Spn and interrogates the storage means. A timing pulse generator 20 supplies timing pulses 19 to the interrogation circuit 18 so as to control the interrogation sequence. Each timing pulse 19 causes an input E1 through En to be switched through to a common output An and, thus, the interrogation circuit 18 provides the function of a sampling circuit in the manner of a periodically stepped change-over switch. The sampled voltage output values stored in digital form are supplied to a digital analog converter 21 and from the output of 21 the signal Um'' is supplied through a capacitor 22 and a diode 23 to the output terminal 25 which is connected to a voltmeter 26. A resistor 24 is connected between ground and a junction point between capacitor 22 and the diode 23 and the resistor 24 and diode 23 comprise a rectifier circuit.

If the repetition frequency of the timing pulses 19 is selected to be sufficiently high, the output signal Um'' at the output of the digital to analog converter 21 will have an amplitude which periodically fluctuates. The "period" is defined as being the length of time required by the interrogation circuit 18 to interrogate all the inputs E1 through En one time. The capacitor 22 cuts off the mean DC value from the voltage Um'' and the rectifier circuit comprising the diode 23 and resistor 24 is supplied with an AC voltage whose amplitude corresponds to the amplitude fluctuations of Um''. Therefore, at the output terminal 25 there will occur a DC voltage Ug which represents a signal for measuring the amplitude fluctuations of Um'' and Um' and, thus, of the distortion caused by the attenuation existing between the circuit points 7 and 8 in the frequency band determined by the individual frequencies f1 through fn. If the signal Ug is displayed with the use of a voltmeter 26, each of the adjusting attenuation control elements 2a of the attenuation corrector 2 and the adjusting elements 4a of the attenuating corrector 4 which influence the attenuation characteristic curve of the correctors 2 and 4 can be adjusted during the display in a simple manner so as to assure that Ug is at a minimum level. The adjustment of each of the individual adjusting elements 2a and 4a requires use of a multifrequency cycle from f1 through fn and also a plurality of interrogation cycles which according to the higher repetition frequency of the timing pulses 19 relative to the switch-over frequency of the measuring transmitter 6 require considerably shorter time intervals.

According to a further development of the invention, the voltage Um" can also be fed to the vertical deflecting means of a cathode ray oscilloscope 27 which has a horizontal deflecting means which is fed with the output voltage of a digital analog converter 28 which receives inputs E11 through E1n that are connected to the output $a_1$ through $a_n$ of the counter 14 as shown. If in the event of an output on lead $a_1$ of the counter 14, digital to analog converter 28 supplies a voltage which corresponds to the deflection of the image point at the left edge of the screen and in the event of an output on lead $a_n$ a voltage is supplied which signifies a deflection at the right edge of the screen, than the voltage excursion of Um" and the overall attenuation characteristic between the circuit point 7 and 8 is represented over the entire frequency band determined by the individual frequency f1 through fn. Therefore, the possibility exists of adjusting each of the adjusting elements 2a and 4a until an optimized level curve is obtained.

Although the invention has been described with respect to preferred embodiments, it is not to be so limited, as changes and modifications may be made which are within the full intended scope as defined by the appended claims.

I claim as my invention:

1. A circuit arrangement for determining the frequency dependent amplitude fluctuation characteristic of a communications transmission link, including a measuring transmitter which produces a measuring signal of constant amplitude and at a frequency which is variable within the transmission frequency band, and a measuring device which receives said measuring signal, after it has passed through the communications transmission link, and said measuring device measures the frequency-dependent amplitude fluctuations of said measuring signal, and wherein said measuring transmitter (6) delivers a series of n individual frequencies (f1, f2 . . . fn) which lie in the frequency gaps between the individual communications transmission channels (K1 . . . Kn) of said communications transmission link, an analog to digital converter (17) receiving the output of said communications transmission link, a plurality of n digital storage means (Sp1, Sp2 . . . Spn) each of them being individually assigned to the n frequencies (f1, f2 . . . fn) and into which the received measuring signals (Um') are individually supplied from the output of said analog to digital converter (17), an interrogation circuit (18) to consecutively interrogate said digital storage means (Sp1, Sp2 . . . Spn), a digital to analog converter (21) connected to the output of said interrogation circuit, , a capacitor (22) which cuts off the DC mean value connected to the output of said analog to digital converter, a rectifier circuit (23, 24) connected to said capacitor to produce a voltage (Ug) which indicates the frequency-dependent amplitude fluctuation of the measuring signal (Um'), and a voltmeter (26) connected to the output of said rectifier circuit (23, 24).

2. A circuit arrangement as claimed in claim 1 including a selective heterodyne receiver (9) is provided, the tuning of which can be switched in synchronism with the measuring transmitter (6) to the individual frequencies (f1, f2 . . . fn) and which has its output connected to said analog-digital converter (17), a plurality of gate circuits (G1, G2 . . . Gn) which are individually enabled consecutively at the timing of the frequency switchovers of the measuring transmitter (6) receiving the output of said analog to digital converter and supplying inputs to said digital storage means (Sp1, Sp2 . . . Spn).

3. A circuit arrangement according to claim 2, including a cathode ray oscillograph (27) provided which has its vertical deflecting means fed with the voltage (Ug) which indicates the frequency-dependent amplitude fluctuations of the received measuring signal (Um'), and which has its horizontal deflecting means fed with a deflecting voltage which corresponds to the particular connected individual frequency (f1, f2 . . . fn).

* * * * *